US007162712B2

(12) United States Patent
Shaylor et al.

(10) Patent No.: US 7,162,712 B2
(45) Date of Patent: Jan. 9, 2007

(54) METHOD AND APPARATUS FOR CREATING STRING OBJECTS IN A PROGRAMMING LANGUAGE

(75) Inventors: Nicholas Shaylor, Sunnyvale, CA (US); Douglas N. Simon, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 679 days.

(21) Appl. No.: 10/351,106

(22) Filed: Jan. 24, 2003

(65) Prior Publication Data

US 2004/0001010 A1 Jan. 1, 2004

Related U.S. Application Data

(60) Provisional application No. 60/392,375, filed on Jun. 26, 2002, provisional application No. 60/412,607, filed on Sep. 20, 2002.

(51) Int. Cl.
*G06F 9/44* (2006.01)
*G06F 9/45* (2006.01)

(52) U.S. Cl. .................. 717/114; 717/116; 717/165

(58) Field of Classification Search ........ 717/114–118, 717/162–166
See application file for complete search history.

(56) References Cited

U.S. PATENT DOCUMENTS

| 5,437,025 | A * | 7/1995 | Bale et al. ............... 707/103 R |
| 6,081,665 | A * | 6/2000 | Nilsen et al. ................ 717/116 |
| 6,260,187 | B1 * | 7/2001 | Cirne .......................... 717/110 |
| 6,523,168 | B1 * | 2/2003 | Arnold et al. ............... 717/116 |
| 6,578,192 | B1 * | 6/2003 | Boehme et al. ............. 717/115 |
| 6,658,652 | B1 * | 12/2003 | Alexander et al. .......... 717/128 |
| 6,694,507 | B1 * | 2/2004 | Arnold et al. ............... 717/108 |
| 6,701,514 | B1 * | 3/2004 | Haswell et al. ............. 717/115 |
| 6,728,722 | B1 * | 4/2004 | Shaylor ....................... 707/101 |
| 6,751,790 | B1 * | 6/2004 | Sokolov et al. ............. 717/148 |
| 6,931,623 | B1 * | 8/2005 | Vermeire et al. ........... 717/108 |
| 6,934,944 | B1 * | 8/2005 | McGuire ..................... 717/165 |
| 6,952,706 | B1 * | 10/2005 | Williamson et al. .... 707/103 Y |
| 6,993,759 | B1 * | 1/2006 | Aptus et al. ................ 717/170 |
| 7,055,130 | B1 * | 5/2006 | Charisius et al. ........... 717/108 |

OTHER PUBLICATIONS

Tabatabai et al, "Compiler and runtime support for efficient software transactional Memoey", ACM PLDI, pp. 26-37, 2006.*

(Continued)

*Primary Examiner*—Anil Khatri
(74) *Attorney, Agent, or Firm*—Park Vaughan & Fleming LLP; Edward J. Grundler

(57) ABSTRACT

One embodiment of the present invention provides a system for implementing a string object defined in a programming language. Upon receiving characters to be embedded in the string object, the system allocates space for the string object that includes a header, which is appended to a character array of the string object. Next, the system copies the characters into the character array of the string object. The system also initializes the header by initializing a class pointer in the header to point to a class for the string object, and by initializing a length field in the header to specify a length for the string object. In this way, the string object remains compatible with previous implementations of the string object that use a character array that is separate from the string object.

16 Claims, 5 Drawing Sheets

OTHER PUBLICATIONS

Rippert et al, "A low footprint class loading mechanism for embadded java virtual machines", ACM PPPJ, pp. 75-82, 2004.*
Grossman etal, "Region nased memeory management in cyclone", ACM PLDI, pp. 282-292, 293.*

Hertz et al, "Quantifying the performance of garbage collection vs explicit memory mangement", ACM OOPSLA, pp. 313-326, 2005.*

* cited by examiner

METHOD AND APPARATUS FOR CREATING STRING OBJECTS IN A PROGRAMMING LANGUAGE

RELATED APPLICATION

This application hereby claims priority under 35 U.S.C. § 119 to U.S. Provisional Patent Application No. 60/392,375, filed on Jun. 26, 2002, entitled "Optimizing Platform Independent Code," by inventors Nicholas Shaylor and Douglas Simon and to U.S. Provisional Patent Application No. 60/412,607, filed on Sep. 20, 2002, entitled "The Squawk System," by inventors Nicholas Shaylor and Douglas Simon.

BACKGROUND

1. Field of the Invention

The present invention relates to programming languages. More specifically, the present invention relates to a method and an apparatus for implementing string objects defined within a programming language.

2. Related Art

Dramatic advances in computer technology presently make it possible to integrate a significant amount of computing power onto "smart cards." Smart cards are presently used in a variety of applications that solve common security and identity needs. For example, smart cards have been integrated into credit cards, debit cards, corporate badges, and even cell phones.

New smart card designs can accommodate larger amounts of memory, for example, new smart card designs can accommodate up to 160K bytes of read-only memory (ROM), 64K bytes of electrically erasable programmable read-only memory (EEPROM), and 8K bytes of random access memory (RAM). These larger amounts of memory make it possible to integrate more functionality into a smart card. In particular, the additional memory can be used to implement a virtual machine, such as the JAVA™ virtual machine (JVM), in a smart card, and to allow the use of objects defined within an object-oriented programming system. (JAVA is a trademark of SUN Microsystems, Inc. of Santa Clara, Calif.) Integrating a virtual machine into a smart card enables the smart card execute a large number of platform-independent applications. Moreover, the associated development environment for the virtual machine can simplify the process of developing applications for smart cards.

While it is possible to implement a virtual machine on one of these smart cards, the memory is still quite limited compared to a typical desktop computer system. This limited memory leads to many challenges in the implementing an object-oriented programming system.

For example, FIG. 1 depicts an implementation of a string object as commonly implemented in the JAVA programming language. This implementation includes two parts: a string object 102 and a character array 114. Note that strings may be represented in this manner in programming languages and systems other than "object-oriented" systems.

String object 102 includes a class pointer 104, an array pointer 106, an offset 108, and a length 110. Class pointer 104 points to string class 112 and thereby identifies string object 102 as belonging to string class 112. Array pointer 106 points to the beginning of array of characters 122 within character array 114. Offset 108 points to the beginning of a sub-string 124 within array of characters 122. Finally, length 110 specifies the length of sub-string 124.

Character array 114 includes a length 116, a class pointer 118, and an array of characters 122. Class pointer 118 points to character class 120, which indicates that the object is a character array 114. Typically, characters in character array 114 are stored as sixteen-bit UNICODE™ characters. UNICODE is a trademark or registered trademark of UNICODE, Inc. Length 116 describes the length of the string in array of characters 122.

The implementation described above requires a minimum of twenty-eight bytes to store a single character-sixteen for string object 102 and twelve for character array 114. While using this amount of storage on a desktop machine with large amounts of memory might be acceptable, using this amount of storage on a small computing device, such as a smart card, or a computing device such as a web server that handles a large number of strings, needlessly reduces the available memory on these devices.

Hence, what is needed is a method and an apparatus for implementing string objects in a programming language without using an excessive amount of memory.

SUMMARY

One embodiment of the present invention provides a system for implementing a string object defined in a programming language. Upon receiving characters to be embedded in the string object, the system allocates space for the string object that includes a header, which is appended to a character array of the string object. Next, the system copies the characters into the character array of the string object. The system also initializes the header by initializing a class pointer in the header to point to a class for the string object, and by initializing a length field in the header to specify a length for the string object. In this way, the string object remains compatible with previous implementations of the string object that use a character array that is separate from the string object.

In a variation of this embodiment, characters within the string buffer are encoded in a sixteen-bit standard character code.

In a further variation, characters within the string buffer are encoded in an eight-bit standard character code.

In a further variation, characters within the string buffer are encoded in a variable-length standard character code.

In a further variation, the string buffer is created by first assuming that characters to be added to the string buffer can be encoded in an eight-bit representation.

In a further variation, if characters are encountered that will not fit in the eight-bit representation, the string buffer is converted to use a sixteen-bit representation.

In a further variation, the string buffer is converted to use a variable-length representation to save storage space.

In a further variation, a class pointer is moved to convert the character array into a string object instead of copying the string object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 2:
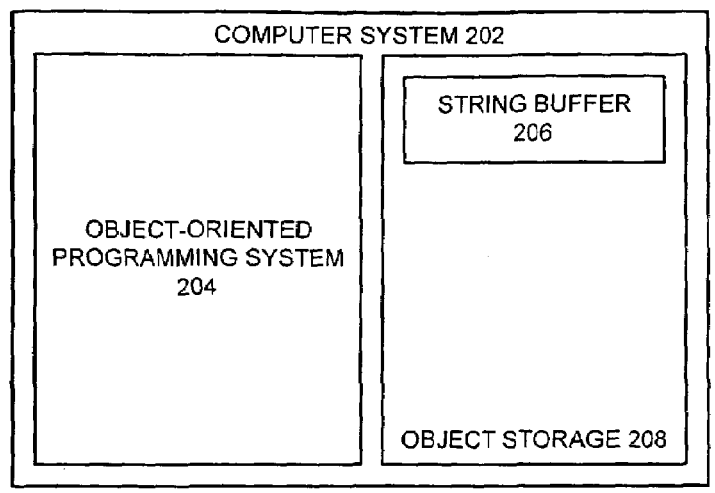
FIG. 2 illustrates a computer system in accordance with an embodiment of the present invention.

FIG. 2 illustrates a computer system 202 in accordance with an embodiment of the present invention. Computer system 202 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 2, computer system 202 includes object-oriented programming system 204 and object storage 208. Object storage 208 includes string buffer 206. Note that the system applies equally to programming systems other than object-oriented programming systems. Only object-oriented systems will be described herein.

Object-oriented programming system 204 can for example include a JAVA virtual machine or any other object-oriented programming system. Object-oriented programming system 204 executes application programs that operate on objects. In doing so, object-oriented programming system 204 uses string buffer 206 to store temporary data, for example, during string object construction. Object storage 208 is used to store objects such as string buffer 206 and string objects.

During operation, object-oriented programming system 204 creates a string object by first creating string buffer 206. Once string buffer 206 has been created and initialized, string buffer 206 is transformed into a string object within object storage 208. This process is described in more detail below in conjunction with FIG. 7.

Sixteen-Bit Encoding

Figure 3:
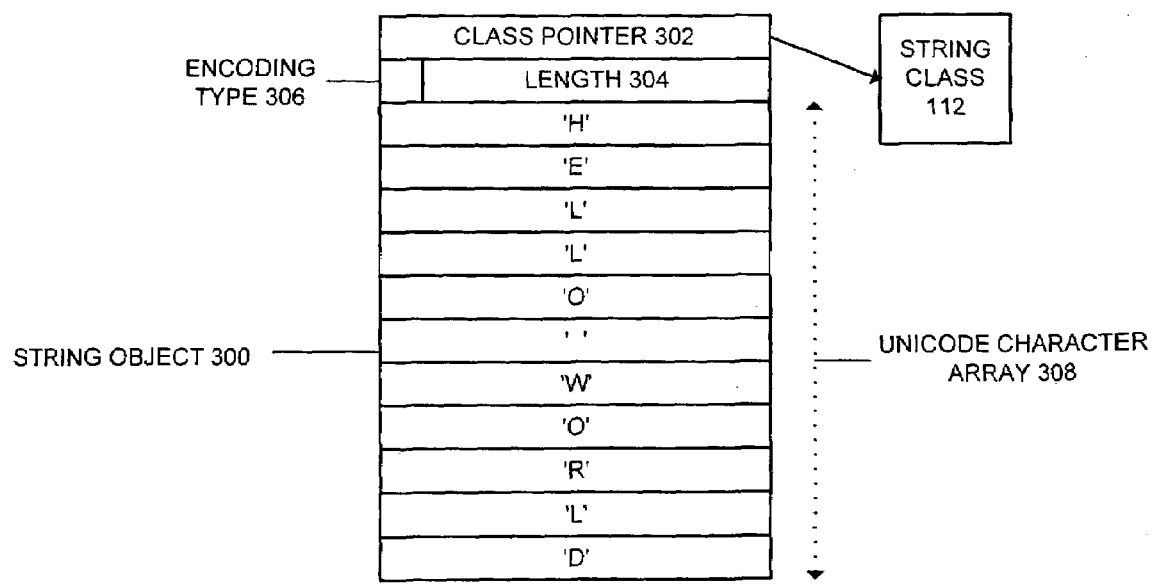
FIG. 3 illustrates a string object encoded in a sixteen-bit character code in accordance with an embodiment of the present invention.

FIG. 3 illustrates a string object 300 encoded using a sixteen-bit character code in accordance with an embodiment of the present invention. String object 300 includes class pointer 302, length 304, encoding type 306, and UNICODE character array 308.

Figure 1:
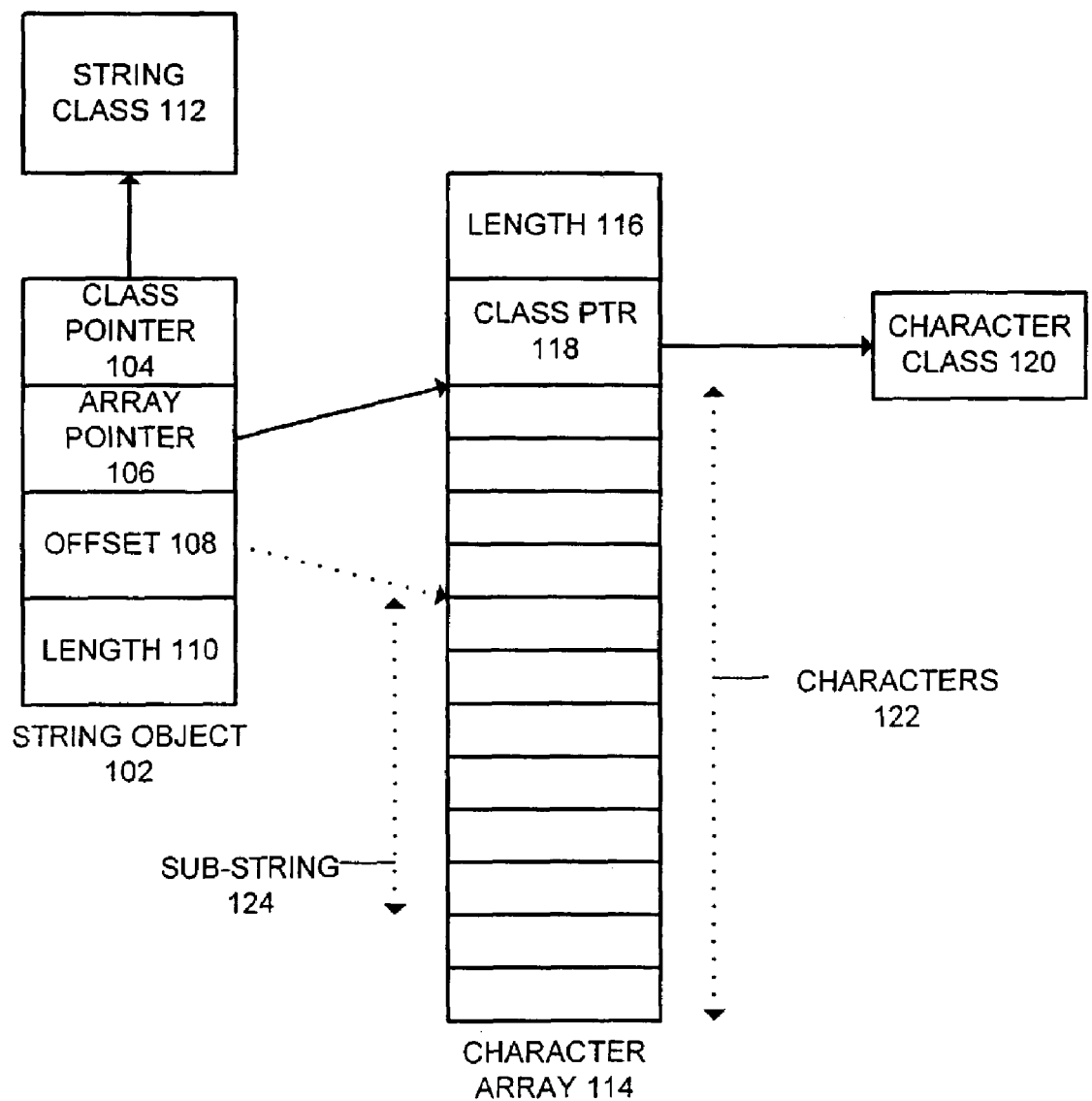
FIG. 1 illustrates a typical string object implementation for the JAVA programming language.

Class pointer 302 points to string class 112, thereby identifying object 300 as belonging to string class 112. This maintains compatibility with the string object implemented using a separate character array described above with reference to FIG. 1. Note, however, that the system does not allocate memory for string object 102 as illustrated in FIG. 1. This reduces the memory footprint of string object 300 in comparison to the implementation illustrated in FIG. 1.

Length 304 specifies the length of string object 300 while encoding type 306 specifies the encoding type for characters within string object 300. For example, the encoding type for string object 300 is the 16-bit UNICODE character encoding. The characters for the string are stored as illustrated in UNICODE character array 308.

Eight-Bit Encoding

Figure 4:
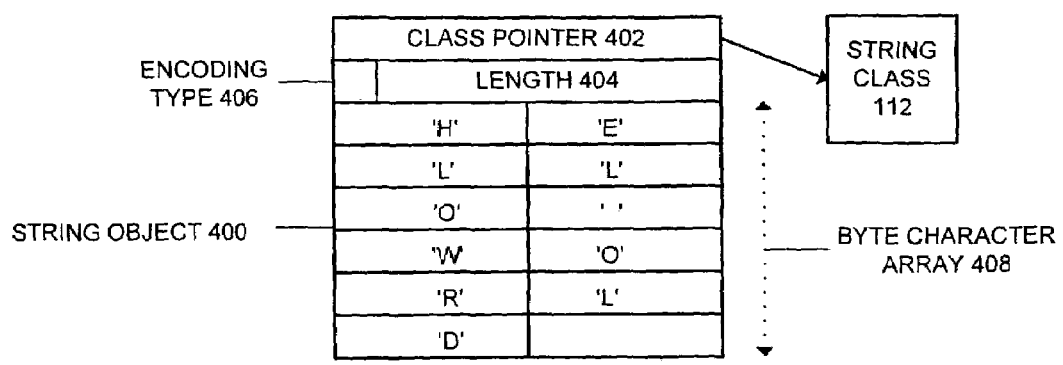
FIG. 4 illustrates a string object encoded in an eight-bit character code in accordance with an embodiment of the present invention.

FIG. 4 illustrates a string object 400 encoded in an eight-bit character code in accordance with an embodiment of the present invention. String object 400 includes class pointer 402, length 404, encoding type 406, and BYTE character array 408.

Class pointer 402 points to string class 112, thereby identifying object 400 as belonging to string class 112. This maintains compatibility with the string object implemented using a separate character array described above with reference to FIG. 1. Note, however, that the system does not allocate memory for string object 102 as illustrated in FIG. 1. This reduces the memory footprint of string object 400 in comparison to the implementation illustrated in FIG. 1.

Length 404 specifies the length of string object 400 while encoding type 406 specifies the encoding type for the characters within string object 400. In this example, the encoding type for string object 400 is BYTE character encoding. Hence, the characters of the string are stored as illustrated in BYTE character array 408. Note that using a BYTE character representation can greatly reduce the amount of space allocated to a given string object.

Variable Length Encoding

Figure 5:
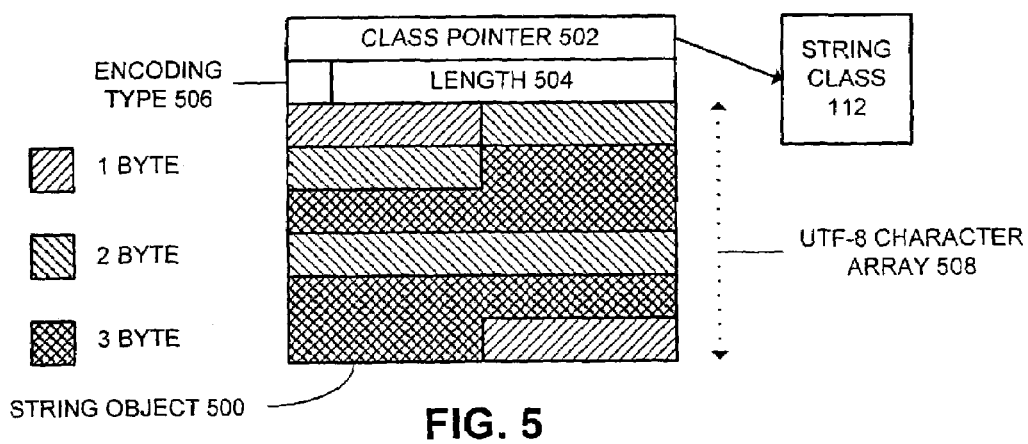
FIG. 5 illustrates a string object encoded in a variable-length character code in accordance with an embodiment of the present invention.

FIG. 5 illustrates a string object 500 encoded in a variable length character code in accordance with an embodiment of the present invention. String object 500 includes class pointer 502, length 504, encoding type 506, and, for example, UTF-8 character array 508. Other variable length encoding schemes can be used.

Class pointer 502 points to string class 112, thereby identifying object 500 as belonging to string class 112. This maintains compatibility with the string object implemented using a separate character array described above with reference to FIG. 1. Note, however, that the system does not allocate memory for string object 102 as illustrated in FIG. 1. This reduces the memory footprint of string object 500 in comparison to the implementation illustrated in FIG. 1.

Length 504 specifies the length of string object 500 while encoding type 506 specifies the encoding type for the characters within string object 500. The encoding type for string object 500 is UTF-8 character encoding-a variable length character encoding. The characters of the string are stored as illustrated in UTF-8 character array 508.

Note that using a UTF-8 character representation can provide a savings in the number of bytes allocated to a given string object as compared to a Unicode representation. Also note that using the variable length character encoding requires greater computation time to extract a given character from UTF-8 character array 508. As is illustrated in FIG. 5, characters in the variable-length character encoding can be encoded using one, two, or, three bytes. Note that other encodings are possible as well.

Alternate Encoding Method

Figure 6:
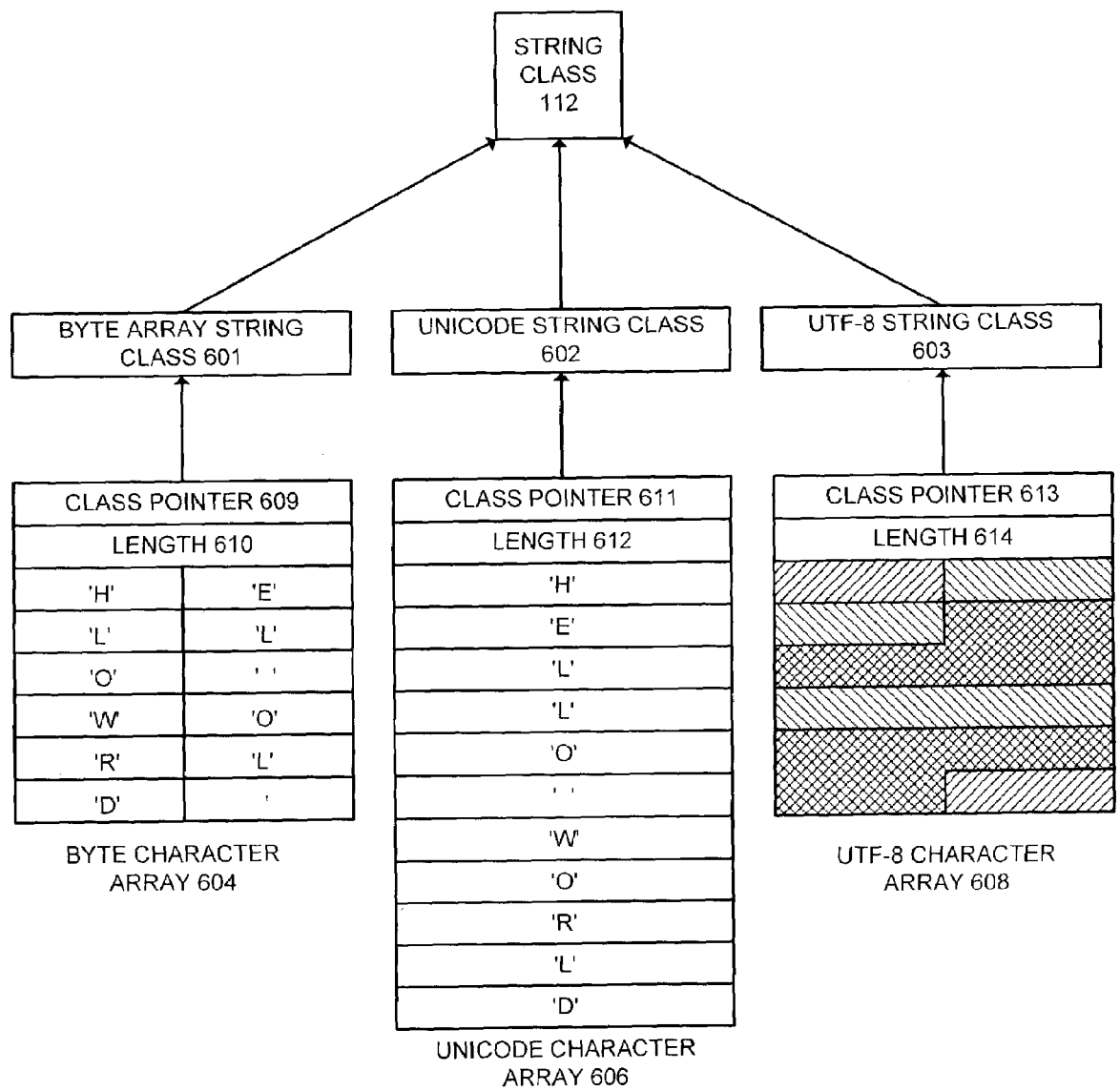
FIG. 6 illustrates an alternate string object encoding method in accordance with an embodiment of the present invention.

FIG. 6 illustrates alternative string object encoding methods in accordance with an embodiment of the present invention. Note that these alterative encoding methods do not use an encoding bit. Instead, three different instances of the string class 112 are provided (byte array string class 601, Unicode string class 602, and UTF-8 string class 603). These are referenced by byte character array 604, Unicode character array 606 and UTF-8 character array 608, respectively.

Byte character array 604 includes a set of bytes that encode character values, as well as a length 610 for byte character array 604, and a class pointer 609, which points to byte array string class 601.

Similarly, Unicode character array 606 includes a set of 16-bit Unicode symbols that encode character values, as well as a length 612 for Unicode character array 606, and a class pointer 611, which points to Unicode array string class 602.

Finally, UTF-8 character array 606 includes a set of variable length UTF-8 symbols that encode the character values, as well as a length 614 for UTF-8 character array 608, and a class pointer 613, which points to UTF-8 array string class 106.

Creating a String Object

Figure 7:
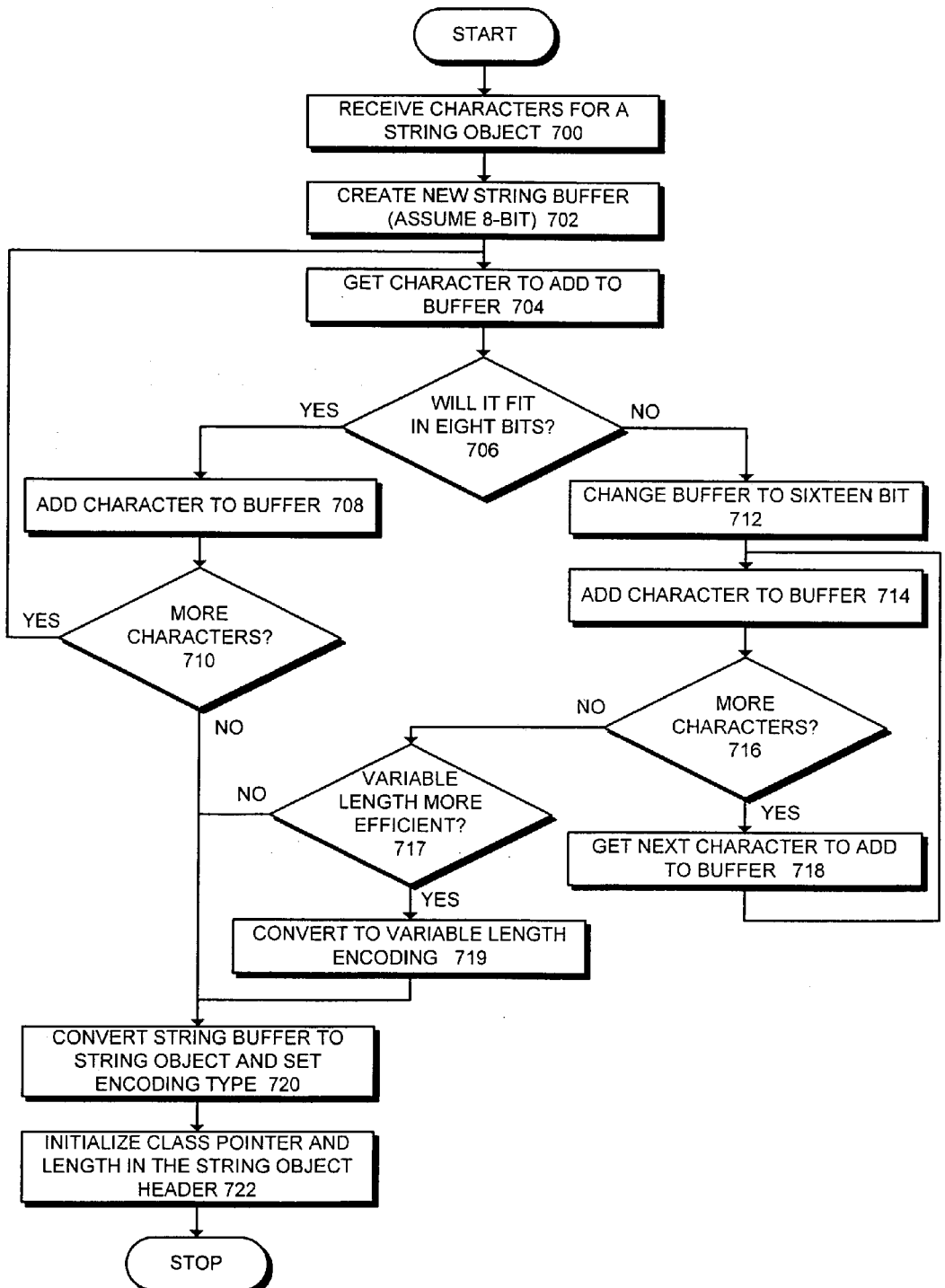
FIG. 7 is a flowchart illustrating the process of creating a string object in accordance with an embodiment of the present invention.

FIG. 7 is a flowchart illustrating the process of creating a string object in accordance with an embodiment of the present invention. The system starts when characters are received for a string object (step 700). Next, the system creates a new string buffer assuming an eight-bit character representation (step 702). The system then selects a character to add to the string buffer (step 704).

Next, the system determines if the character will fit in an eight-bit representation (step 706). If so, the system adds the character to the string buffer array (step 708). After adding the character to the string buffer array, the system determines if there are more characters to be added to the string buffer (step 710). If so, the process returns to step 704 to select the next character.

If the character will not fit in an eight-bit representation at step 706, the system changes the string buffer array from an eight-bit representation to a sixteen-bit representation (step 712). After each of the characters within the string buffer array have been converted from an eight-bit representation to a sixteen-bit representation, the system adds the character to the string buffer array (step 714). Next, the system determines if there are more characters to add to the string buffer array (step 716). If so, the system retrieves the next character to add to the string buffer array (step 718) and the process returns to step 714 to add the character to the string buffer array.

When there are no more characters at step 716, the system can optionally calculate whether a variable length encoding such as UTF-8 would use storage space more efficiently (step 717). If so, the system can convert the string buffer array to the variable length encoding (step 719).

When there are no more characters at step 710 or 716, or optionally, after the possible conversion of the string buffer array into variable length encoding, the system converts the string buffer into a string object and sets the encoding type (step 720). In one embodiment of the present invention, this involves moving the class pointer to convert the character array into a string object instead of copying the string object. Finally, the system initializes the class pointer and the length in the string header (step 722).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for implementing a string object defined in a programming language, comprising:
   receiving characters to be embedded in the string object;
   allocating a space for a string buffer, wherein the space includes a header which is appended to a character array of the string buffer;
   copying the characters into the character array of the string buffer;
   converting the string buffer into the string object without allocating memory for a separate string object, wherein converting the string buffer into the string object reduces a memory footprint of the string object; and
   initializing the header by initializing a class pointer in the header to point to a class for the string object, and by initializing a length field in the header to specify a length for the string object;
   whereby the string object remains compatible with previous implementations of string objects that use a separate character array.

2. The method of claim 1, wherein characters within the character array are encoded in a sixteen-bit standard character code.

3. The method of claim 1, wherein characters within the character array are encoded in an eight-bit standard character code.

4. The method of claim 1, wherein characters within the character array are encoded in a variable-length standard character code.

5. The method of claim 1, wherein the character array is created by first assuming that characters to be added to the character array can be encoded in an eight-bit representation.

6. The method of claim 5, wherein if characters are encountered that will not fit in the eight-bit representation, the character array is converted to use a sixteen-bit representation.

7. The method of claim 6, further comprising converting the character array to use a variable-length representation, whereby the variable-length representation saves storage space.

8. The method of claim 1, further comprising moving a class pointer to convert the character array into a string object instead of copying the string object.

9. A tangible computer-readable storage medium storing instructions that when executed by a computer cause the computer to perform a method for implementing a string object defined in a programming language, the method comprising:

receiving characters to be embedded in the string object;

allocating a space for a string buffer, wherein the space includes a header which is appended to a character array of the string buffer;

copying the characters into the character array of the string buffer;

converting the string buffer into the string object without allocating memory for a separate string object, wherein converting the string buffer into the string object reduces a memory footprint of the string object; and initializing the header by initializing a class pointer in the header to point to a class for the string object, and by initializing a length field in the header to specify a length for the string object;

whereby the string object remains compatible with previous implementations of string objects that use a separate character array.

10. The tangible computer-readable storage medium of claim 9, wherein characters within the character array are encoded in a sixteen-bit standard character code.

11. The tangible computer-readable storage medium of claim 9, wherein characters within the character array are encoded in an eight-bit standard character code.

12. The tangible computer-readable storage medium of claim 9, wherein characters within the character array are encoded in a variable-length standard character code.

13. The tangible computer-readable storage medium of claim 9, wherein the character array is created by first assuming that characters to be added to the character array can be encoded in an eight-bit representation.

14. The tangible computer-readable storage medium of claim 13, wherein if characters are encountered that will not fit in the eight-bit representation, the character array is converted to use a sixteen-bit representation.

15. The tangible computer-readable storage medium of claim 14, the method further comprising converting the character array to use a variable-length representation, whereby the variable-length representation saves storage space.

16. The tangible computer-readable storage medium of claim 9, the method further comprising moving a class pointer to convert the character array into a string object instead of copying the string object.

* * * * *